United States Patent [19]

Hosoi

[11] Patent Number: 4,897,792
[45] Date of Patent: Jan. 30, 1990

[54] METHOD OF MEMORIZING TRAVEL LOCUS DATA FOR USE IN AN AUTOMOTIVE NAVIGATION SYSTEM

[75] Inventor: Masayuki Hosoi, Tokorozawa, Japan

[73] Assignee: Pioneer Electronic Corporation, Tokyo, Japan

[21] Appl. No.: 248,094

[22] Filed: Sep. 23, 1988

[30] Foreign Application Priority Data

Sep. 29, 1987 [JP] Japan ................ 62-245620
Sep. 29, 1987 [JP] Japan ................ 62-245621
Sep. 29, 1987 [JP] Japan ................ 62-245622

[51] Int. Cl.⁴ .................. G06F 15/50; G07B 29/10
[52] U.S. Cl. .................. 364/449; 340/990; 340/995
[58] Field of Search .......... 364/443, 444, 449; 73/178 R; 340/988, 990, 995; 342/450, 451

[56] References Cited

U.S. PATENT DOCUMENTS

| | | | |
|---|---|---|---|
| 4,514,810 | 4/1985 | Ito et al. .................. | 73/178 R |
| 4,535,335 | 8/1985 | Tagami et al. ............ | 364/449 |
| 4,646,089 | 2/1987 | Takanabe et al. ......... | 340/988 |
| 4,660,037 | 4/1987 | Nakamura ................ | 340/988 |
| 4,663,629 | 5/1987 | Tagami et al. ............ | 340/988 |
| 4,737,927 | 4/1988 | Hanabusa et al. ........ | 364/449 |
| 4,796,189 | 1/1989 | Nakayama et al. ....... | 340/990 |

Primary Examiner—Gary Chin
Attorney, Agent, or Firm—Fleit, Jacobson, Cohn, Price, Holman & Stern

[57] ABSTRACT

A method of recording the travel locus data for an on-board navigation system for motor vehicles stores, at the time of storing data of each location of roads in maps in numberical form, index numbers, which are allotted in sequence to particular locations on the road for each road, together with map numbers each of which is allotted to each map and path numbers each of which is allotted to each road within each map. When the vehicle is running, the map number and the path number are monitored while the present location of the the vehicle is being recognized, and a previous map number, a previous path number and a previous index number are memorized if the present map number is different from the previous map number or the present path number is different from the previous path number. Distinctive point numbers which are allotted to particular locations on the road are also used instead of the path numbers and index numbers. Thus, the amount of data in memorizing the travel locus data is considerably reduced.

3 Claims, 17 Drawing Sheets

MAP NUMBER i

MAP NUMBER i

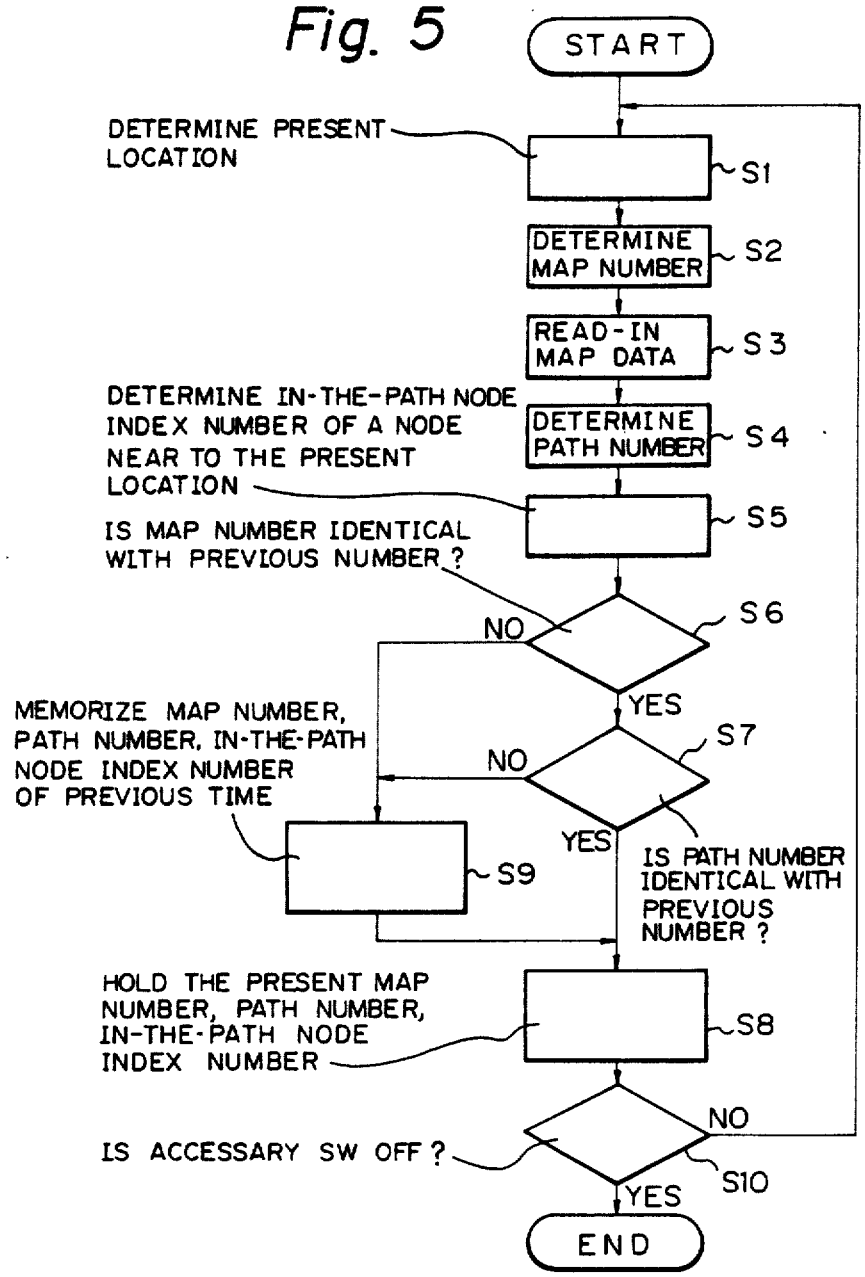

METHOD OF MEMORIZING TRAVEL LOCUS DATA FOR USE IN AN AUTOMOTIVE NAVIGATION SYSTEM

BACKGROUND OF THE INVENTION

1. Field of the Invention

The present invention relates to a method of memorizing travel locus data for use in an on-board navigation system for motor vehicles.

2. Description of Background Information

Recently, application of electronics in the vehicle has progressed largely, and computerized controls are now implemented in various parts of a motor vehicle such as the engine, brake, and suspension. Furthermore, navigation systems to be mounted in a vehicle for guiding the vehicle to a certain destination have entered a stage of practical application. These on-board navigation systems are constructed such that numerical data of a map is previously stored in a memory, map data of a region covering a given area including the present location of the vehicle is read out from the memory while the present location of the vehicle is being recognized, so that a map around the location of the vehicle is displayed on a display, and the location of the vehicle itself is automatically indicated in the map being displayed.

It is extremely advantageous if the travel locus is memorized by any method when the vehicle is traveling with this on-board navigation system, because it can be of great assistance when the same route is taken next time. As an example of such method, it is generally conceivable to record the travel locus every travel of predetermined distance in the form of longitude and latitude data or corresponding data of (X,Y) coordinate every time the traveling distance of vehicle reaches a particular value. With this method, however, the volume of data becomes very large especially when the vehicle travels through a long distance, thus it becomes impossible to record all of the travel locus data. It is also conceivable to thin-out the travel locus data, so as to cut down the amount of data. However, this means that accurate travel locus data cannot be held with such a method.

OBJECT AND SUMMARY OF THE INVENTION

The present invention is based on the above problems, and an object to the present invention is therefore to provide a method of recording the travel locus data for use in an on-board navigation system, by which the travel locus is accurately memorized using only a small amount of data.

According to a first aspect of the invention, a method of recording the travel locus data comprises steps of: at the time of storing data of each location of roads in maps in numerical form, storing index numbers, which are allotted in sequence to particular locations on the road for each road, together with map numbers each of which is allotted to each map and path numbers each of which is allotted to each road within each map; and when the vehicle is running, monitoring the map number and the path number while recognizing the present location of the vehicle, and memorizing a previous map number, a previous path number and a previous index number if the present map number is different from the previous map number or the present path number is different from the previous path number.

According to another aspect of the invention, a method of recording the travel locus data comprises steps of: at the time of storing data of each location of roads in maps in numerical form, storing specific distinctive point numbers, which are alloted particular locations on the road in each map, together with map numbers each of which is allotted to each map and path numbers each of which is allotted to each road within each map; and when the vehicle is running, monitoring the map number and the path number while recognizing the present location of the vehicle, and memorizing a previous map number and a previous distinctive point number if the present map number is different from the previous map number or the present path number is different from the previous path number.

According to a further aspect of the invention, a method of recording the travel locus data comprises steps of: at the time of storing data of each location of roads in maps in numerical form, storing specific distinctive point numbers, which are allotted particular locations on the road in each map, together with map numbers each of which is allotted to each map and path numbers each of which is allotted to each road within each map; and when the vehicle is running, measuring passing times of particular locations and monitoring the map number and the path number while recognizing the present location of the vehicle, and memorizing a passing time of a particular location together with a previous map number and a previous distinctive point number if the present map number is different from the previous map number or the present path number is different from the previous path number.

BRIEF DESCRIPTION OF THE DRAWINGS

FIG. 5 is a flowchart showing a procedure of the method for memorizing travel locus data according to the present invention which is performed by a CPU;

DETAILED DESCRIPTION OF PREFERRED EMBODIMENTS

The embodiments of the present invention will be explained in detail hereinafter with reference to the drawings.

Figure 1:
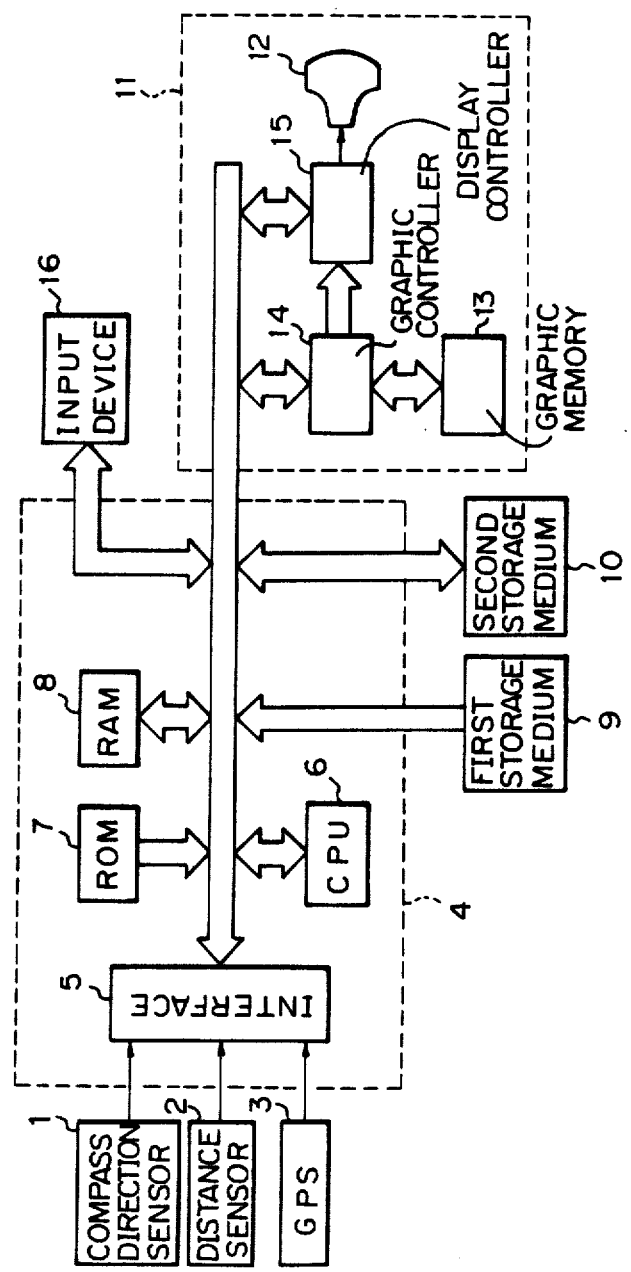
FIG. 1 is a block diagram showing an example of construction of an on-board navigation system in which the method for memorizing travel locus data according to the present invention is adopted.

FIG. 1 is a block diagram showing an example of the construction of the on-board navigation system to which the travel locus memorizing method according to the present invention is applied. In the figure, the numeral 1 denotes a compass direction sensor which determines the direction of the vehicle on the basis of terrestrial magnetism (magnetic field of the earth), for example. The reference numeral 2 denotes a distance sensor for sensing the traveling distance of the vehicle, and the reference numeral 3 denotes a GPS (Global Positioning System) for detecting the present location of the vehicle from longitudinal and latitudinal information, etc. Detection outputs of these sensors and system are supplied to a system controller 4.

The system controller 4 is made up of an interface 5 which receives the detection outputs from the sensors (or system) 1 through 3 and performs the processes such as an A/D (Analog to Digital) conversion, a microprocessor 6 which performs various image data processing operations, and calculates the traveling distance of vehicle and the traveling direction of vehicle on the basis of output data of the sensors (or the system) 1 through 3 supplied from the interface 5 sequentially, a ROM (Read Only Memory) 7 in which various processing programs of the CPU 6 and other necessary information are previously stored, and a RAM (Random Access Memory) 8 into and from which information necessary for executing programs is written and readout.

As external memory devices, the system is provided with a first storage medium 9 of non-volatile type which is used for only reading-out and a second storage medium 10 of non-volatile type which is used both for writing and reading-out. The first storage medium 9 is made up of a CD (Compact Disc) ROM or an IC card, or the like, having a large capacity, in which digitized (in the numerical form) map data is stored. On the other hand, the second storage medium 10 is made up of a digital audio tape or an IC card, or the like, and the travel locus data obtained when the vehicle is running is memorized in this storage medium 10. The CPU 6 performs control operations, when the vehicle is running, to determine the present location of the vehicle on the basis of each output data of the distance sensor 2 and the GPS 3, and read-out from the first storage medium 9 the map data of a region of a given area including the present location of the vehicle, and temporarily memorize them in the RAM 8, and also supplies them to a display unit 11. Further, the CPU 6 performs control operations, when the vehicle is running, to obtain the travel locus data from the map data, and memorize them into the second storage medium 10.

The display unit 11 is made up of a display 12 such as a CRT, a graphic memory 13 made up of a V(Video)-RAM for example, a graphic controller 14 which draws the map data supplied from the system controller 4 in the graphic memory 13 as image data, and outputs this image data, and a display controller 15 which performs control operations to display a map on the CRT display 12 on the basis of image data outputted by the graphic controller 14. An input device 16 such as a keyboard is provided, so that various commands and the like are supplied to the system controller 4 by keying of a user.

Figure 2:
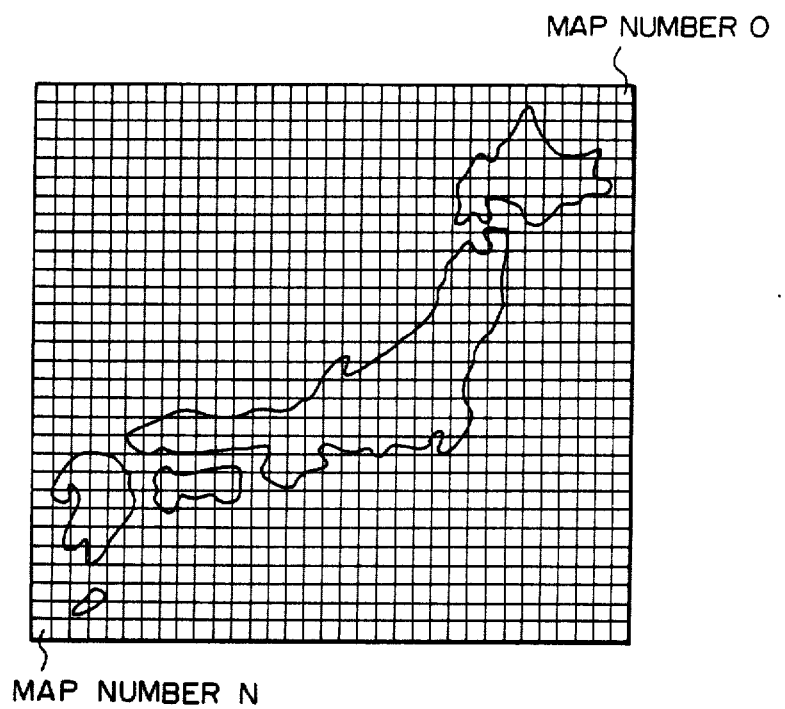
FIG. 2 is a diagram showing a map of the whole Japan which is divided into regions each having a given area.

As mentioned before, the map data is stored in the first storage medium 9. The data format used in storing the map data will be explained hereinafter. At first, as shown in FIG. 2, a map of the whole of Japan is divided into regional maps (referred to as simply "maps" hereinafter) each having a given area, such as maps on a scale of 1 to 25,000 or 1 to 50,000 published by Geographical Survey Institute. A map number is allotted to each of these maps which are then managed by using the map numbers.

Figure 3A:
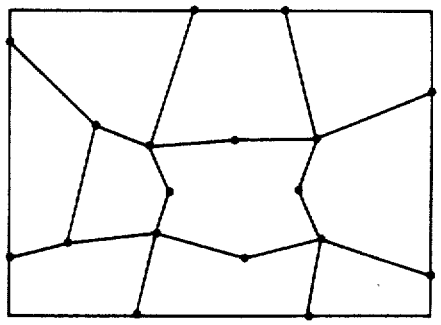
FIGS. 3A and 3B are diagrams showing the data structure of road information.
Figure 3B:
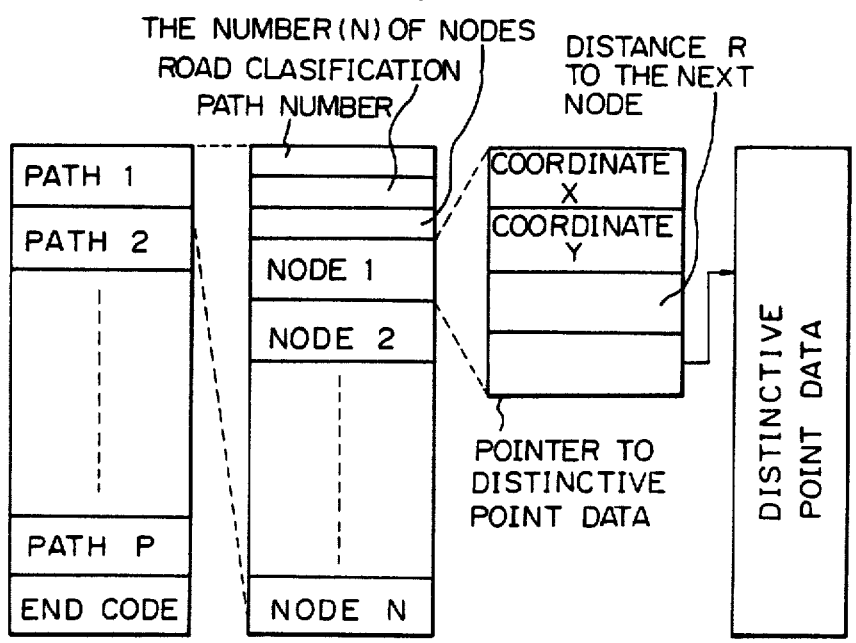

FIGS. 3A and 3B are diagrams showing the data structure, in a concrete form, of road information in a map having a map number "i". As shown in FIG. 3A, the road information is basically made up of a group of lines (referred to as paths hereinafter) connected with each other. A specific path number is allotted to each of the paths in each of the maps, so that one path is distinguished from others. Furthermore, road class information (for example, "0" represents an expressway, "1" represents a national road, "2" represents a prefectural road, and "3" represents an ordinary road) is appended to each path as shown in FIG. 3B, so that expressways, national roads, prefectural roads, and ordinary roads can be distinguished respectively by using this road class information. In addition, each path includes several coordinate points (referred to as nodes hereinafter) which are shown by black spots in FIG. 3A. In each path, these nodes are arranged in such a manner that the nodes can be traced with one stroke from a start point to an end point, and numbers (referred to as in-the-path node index number hereinafter) are allotted in this order. Each node has (X, Y) coordinates which are standardized in each map, and information of the distance (R) to a next node is provided. Furthermore, a pointer for distinctive point information which provides information of any distinctiveness of the node (such as a crossing of the road or a point on the boundary between maps), is also included.

Figure 4A:
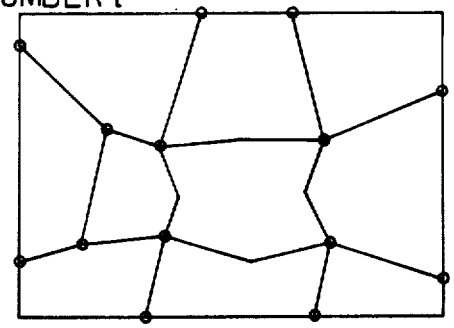
FIG. 4A through 4C are diagrams showing the data structure of distinctive point information.
Figure 4B:
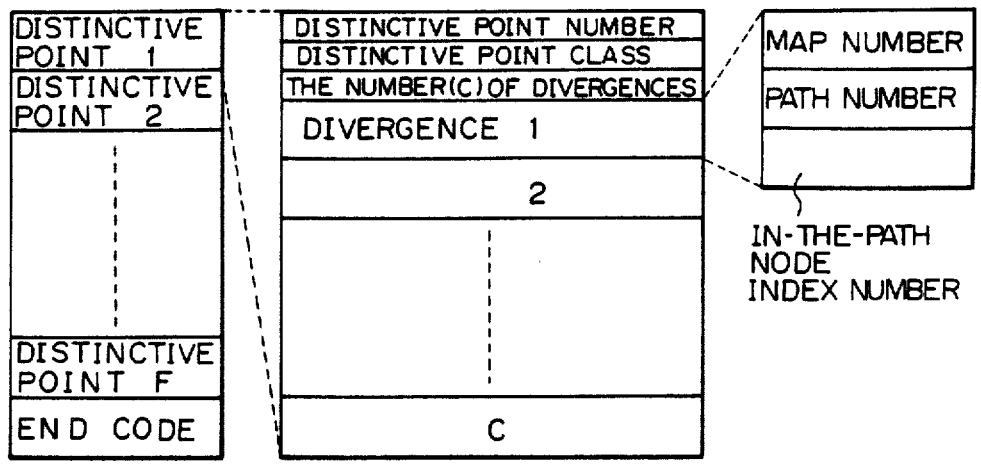
Figure 4C:
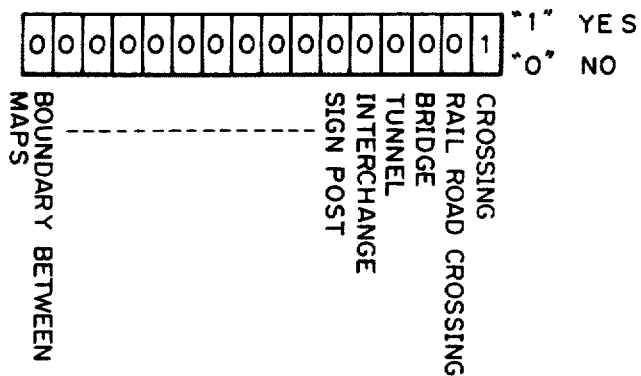

FIGS. 4A through 4C are diagrams showing the data structure, in a concrete form, of the distinctive point information in the map having the map number "i". Each of the distinctive points indicated by white circles in FIG. 4A has a specific distinctive point number in each of the maps as shown in FIG. 4B, so that one distinctive point is distinguished from other distinctive points. The distinctive point information indicates, for example, that the node is a crossing of the road, or a point on the boundary between maps. As shown in FIG. 4C, the content of this information is classified, for example, into sixteen sorts indicated by sixteen bits of binary digit, in which each sort is distinguished by the position of a digit "1" in the sixteen bits. Additionally, in the classification of the distinctive point information, if all of the sixteen bits are "0", it means that the node represents a point which is provided for showing the degree of curvature of the road which is only necessary for the indication of a road. For all nodes, the number C of divergences is equal to or more than one (C≦1), and information of divergence indicating the state of divergence at each node is also written-in. At a crossing or a point of the boundary between maps, path numbers of several roads which are connected to that node, index numbers of that point in the paths (roads), and the map number are stored. For points other than the crossing and the point on the boundary between maps, it is assumed that the number of divergence is equal to one (C=1), and the map number of the map to which that point belongs and the index number are registered.

Now, the process of memorizing the travel locus data according to the present invention, which is performed by the CPU 6 when the vehicle is running, will be explained with reference to the flowchart of FIG. 5.

When the vehicle is running, the CPU 6 determines the present location of the vehicle on the basis of each output data of the compass direction sensor 1, the distance sensor 2, and the GPS 3 at a step S1. Then the CPU 6 determines the map number of a map covering a given area including the present location of the vehicle, from data of the present location obtained in the above step, at a step S2. Subsequently, the CPU 6 reads-out the map data of that map number from the first storage medium 9, and send it to the RAM 8 at a step S3. The map data send to the RAM 8 is also supplied to the display device 11, so that it is displayed on the CRT display 12 together with the location of the vehicle itself.

Figure 6:
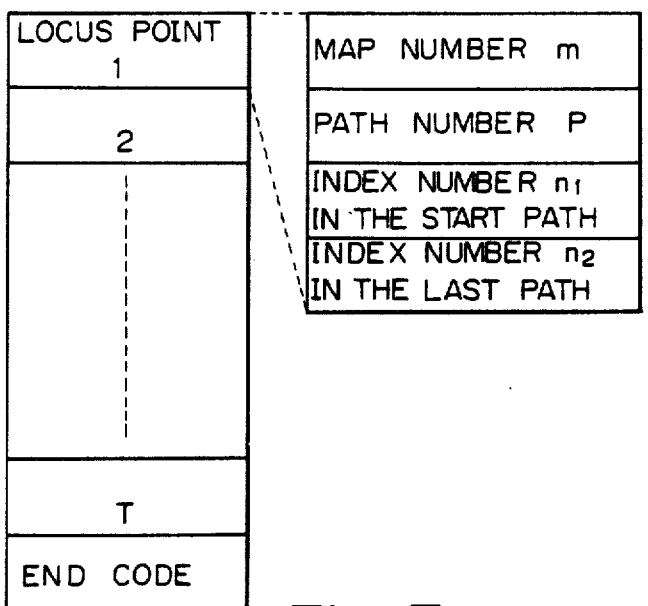
FIG. 6 is a diagram showing a memorizing format of the travel locus data according to the present invention.

Then, the path number of the road on which the vehicle is running is determined from the present location data at a step S4, and the in-the-path node index number of a node near to the present location of the vehicle is determined at a step S5. Subsequently, determination is made as to whether or not the map number obtained on the basis of the present location of the vehicle itself is identical with the map number obtained on the basis of the previous location of the vehicle itself, at a step S6. If the answer is affirmative, determination is successively made as to whether or not the path number obtained on the basis of the present location of the vehicle itself is identical with the path number obtained on the basis of the previous location of the vehicle itself, at a step S7. If the answer is also affirmative at this point of time, the map number, and the path number, and the in-the-path node index number of this time are maintained at a step S8. If the answer is negative at the step S6 or S7, the map number, the path number and the in-the-path node index number of the previous time are memorized into the second storage medium 10 in a format shown in FIG. 6, at a step S9. Then the program shifts to the step S8.

The above operations are repeated until it is judged, at a step S10, that the accessory switch (or the accessory position of the ignition switch) of the vehicle is turned off. In this way, the travel locus data of this time representing the route on which the vehicle traveled can be memorized in the second storage medium 10. To this travel locus data, route identification data is added by the user using the input device 16 for each route, and the travel locus data together with the route identification data is memorized in the second storage medium 10.

In the above embodiment, the system is constructed so that memorization of the travel locus data takes place when the accessory switch of the vehicle is at the on position. However, it is also possible to arrange the system such that a mode for memorizing the travel locus data is provided, and the memorization of the travel locus data is enabled when the above mode is designated through the input device 16.

Figure 7:
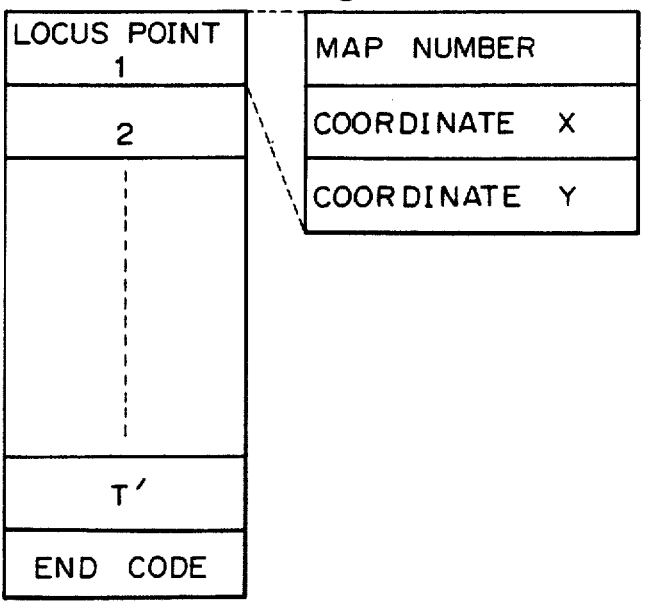
FIG. 7 is a diagram showing a memorizing format in a case in which positional data is memorized every time a given distance is covered.

As explained in the above, the location on which the vehicle itself is running at the moment is managed by using the map number and the (X,Y) coordinates in the map, and the path number and the in-the-path node index number are always monitored by a method of the so-called map matching. When the map number or the path number changes, the map number and the path number are memorized together with the in-the-path node index number indicating a distinctive point which the vehicle passed immediately before the occurrence of the above change. The travel locus data is obtained in this way. Therefore, as compared with the case where the map number and the (X,Y) coordinates are memorized every time a predetermined distance is covered as illustrated in FIG. 7, the amount of data to be memorized is much smaller, and moreover the travel locus is memorized very accurately.

Figure 8:
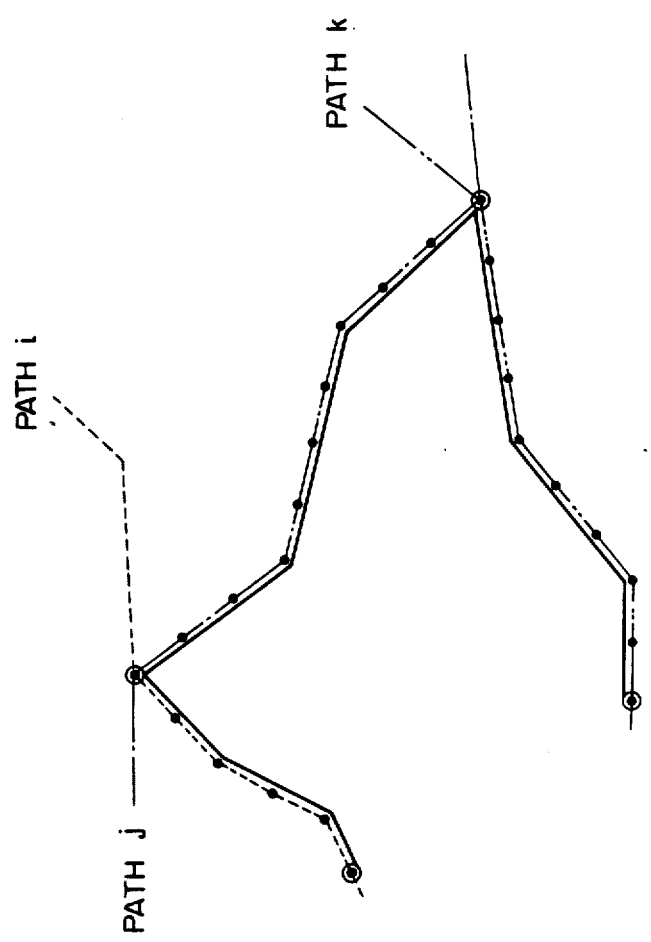
FIG. 8 is a diagram showing locus points to be memorized in a case in which the travel locus data is memorized by using the method according to the present invention and a case of memorizing positional data every time of traveling of a given distance.

Another example in which the travel locus data is memorized by using the method according to the present invention and also the method in which the positional data is stored every time the traveling distance reaches a predetermined distance, is shown in FIG. 8. In this figure, when the vehicle takes a route shown by the solid line which passes through portions of three roads, i.e., a path i shown by the dashed line, a path j shown by the one-dot chain line, and a path k shown by the two-dot chain line, data of positions which are shown by the black spots are to be memorized in order in the case of the method in which positional data are memorized every time of traveling of a predetermined distance. On the other hand, with the method according to the present invention, it is only necessary to memorize the data of the nodes shown by the white spots in the figure. Thus it is ready appreciated that only necessary to memorize small amount of data according to the present invention.

Figure 9:
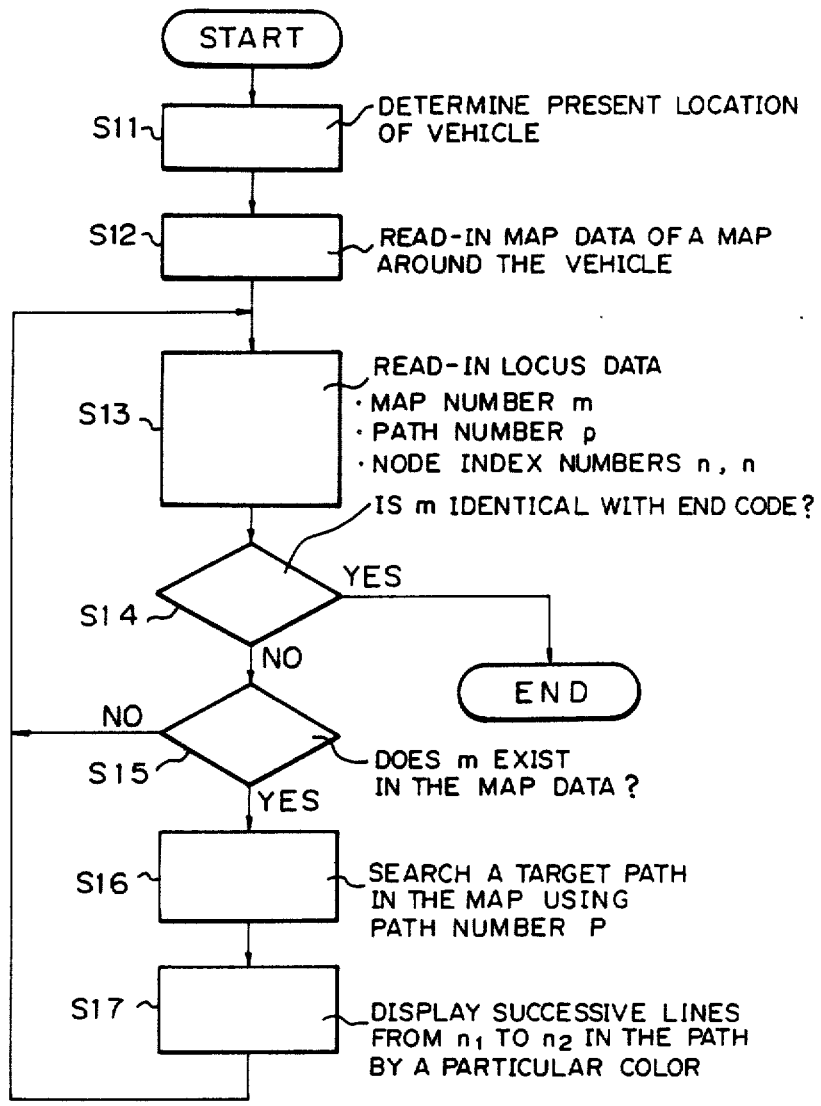
FIG. 9 is a flowchart showing a procedure of displaying a travel locus which is executed by the CPU.

Referring to the flowchart of FIG. 9, explanation will be made as to the procedure of displaying the travel locus which is performed by the CPU 6 when a command of displaying the travel locus is inputted though the input device 16.

When the command of displaying the travel locus and route discrimination information are input through the input device, and subsequently the vehicle started to travel toward a destination, the CPU 6 first determines the present location of the vehicle on the basis of each output data of the compass direction sensor 1, the distance sensor 2, and the GPS 3, at a step S11. Subsequently, the map data of a region of the given area including the present location is read-out from the first storage medium 9 and sent to the RAM 8, at a step S12. This maps data is displayed on the CRT display unit, so that the map data is displayed on the CRT display together with the location of the vehicle itself.

Then, the CPU 6 read-out the travel locus data of the route to be taken designated at the input device 16 from the second storage device 10, at a step S13. The travel locus data is memorized in the format shown in FIG. 6, and the CPU 6 determines whether or not the read-out map number m is identical with an end code, at a step S14. If the read map number is not identical with the end code, the CPU 6 then determines whether or not the read-out map number m exists in the map data memorized in the RAM 8, at a step S15. If the answer is negative, the program returns to the step S13. If the answer is affirmative, i.e., if the map number m exists in the map data, a target path in the map is searched by using the read-out path number P, at a step S16. Then a line in the path from a start index number $n_1$ to an end index number $n_2$ is displayed by using a particular color in the screen, at a step S17.

By the repetition of the above operations, the travel locus of the route to be traveled, designated through the input device 16 is displayed together with a map showing a region around the present location of the vehicle, using a particular color, on the screen of the CRT display 12.

As will be appreciated from the foregoing description, in the above described embodiment of the present invention, at the time of storing data of each location of roads in maps in numerical form, index numerals, which are allotted in sequence to particular locations on the road for each road, are stored together with map numbers each of which is allotted to each map and path numbers each of which is allotted to each road within each map; and when the vehicle is running, the map number and the path number are monitored while recognizing the present location of the vehicle, and a previous map number, a previous path number and a previous index number are memorized if the present map number is different from the previous map number or the present path number is different from the previous path number. Therefore, the travel locus data is accurately memorized by using a smaller amount of data as compared with the case in which positional data is stored every time the travelling distance reaches a given value.

Figure 10:
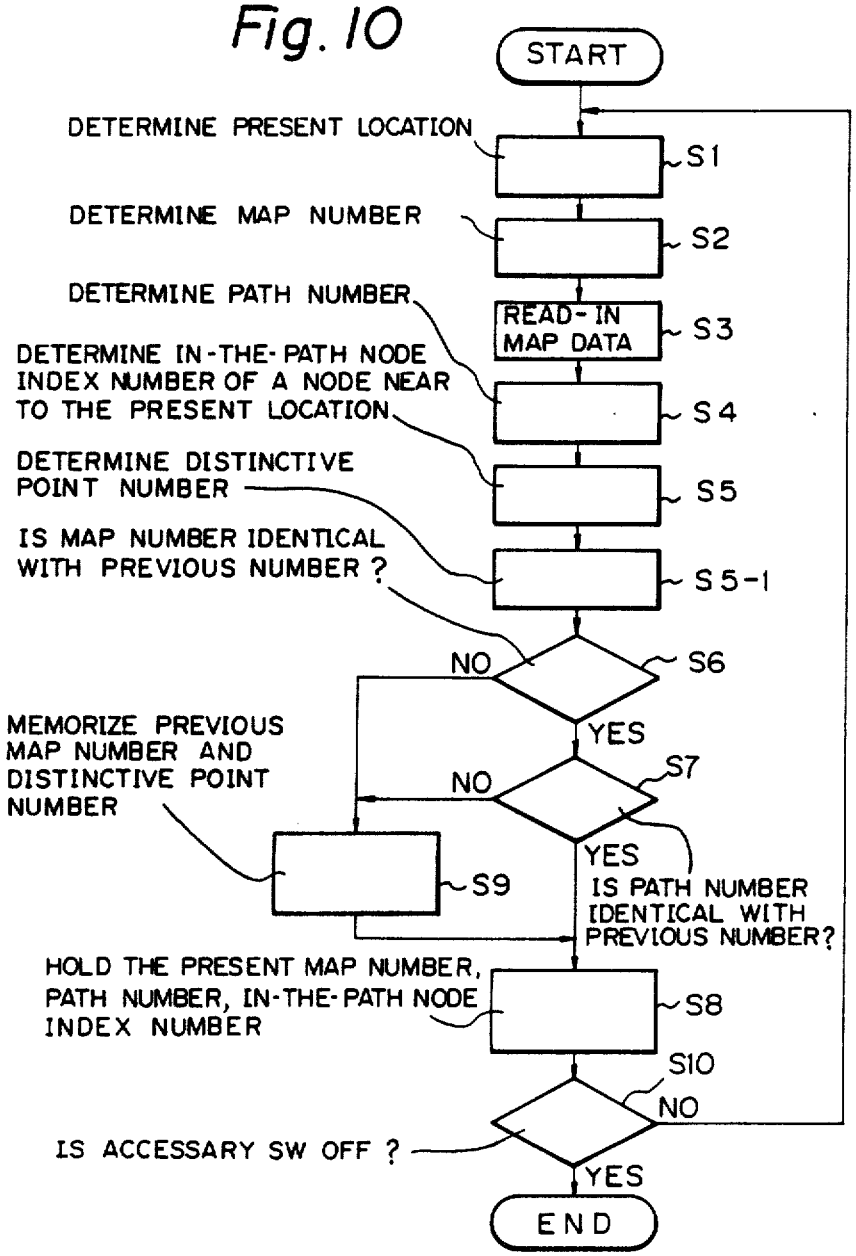
FIG. 10 is a flowchart showing a procedure of memorizing the travel locus data in a second embodiment of the present invention.
Figure 11:
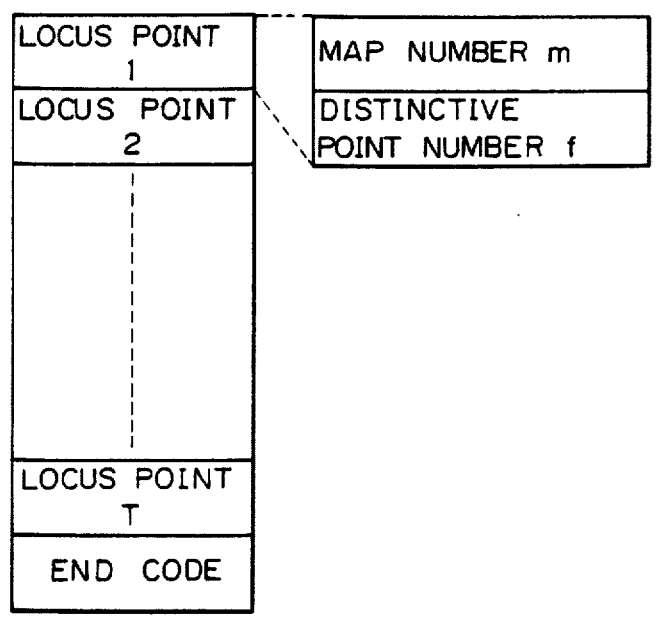
FIG. 11 is a diagram showing a recording format of the travel locus data in the second embodiment of the invention.
Figure 12A:
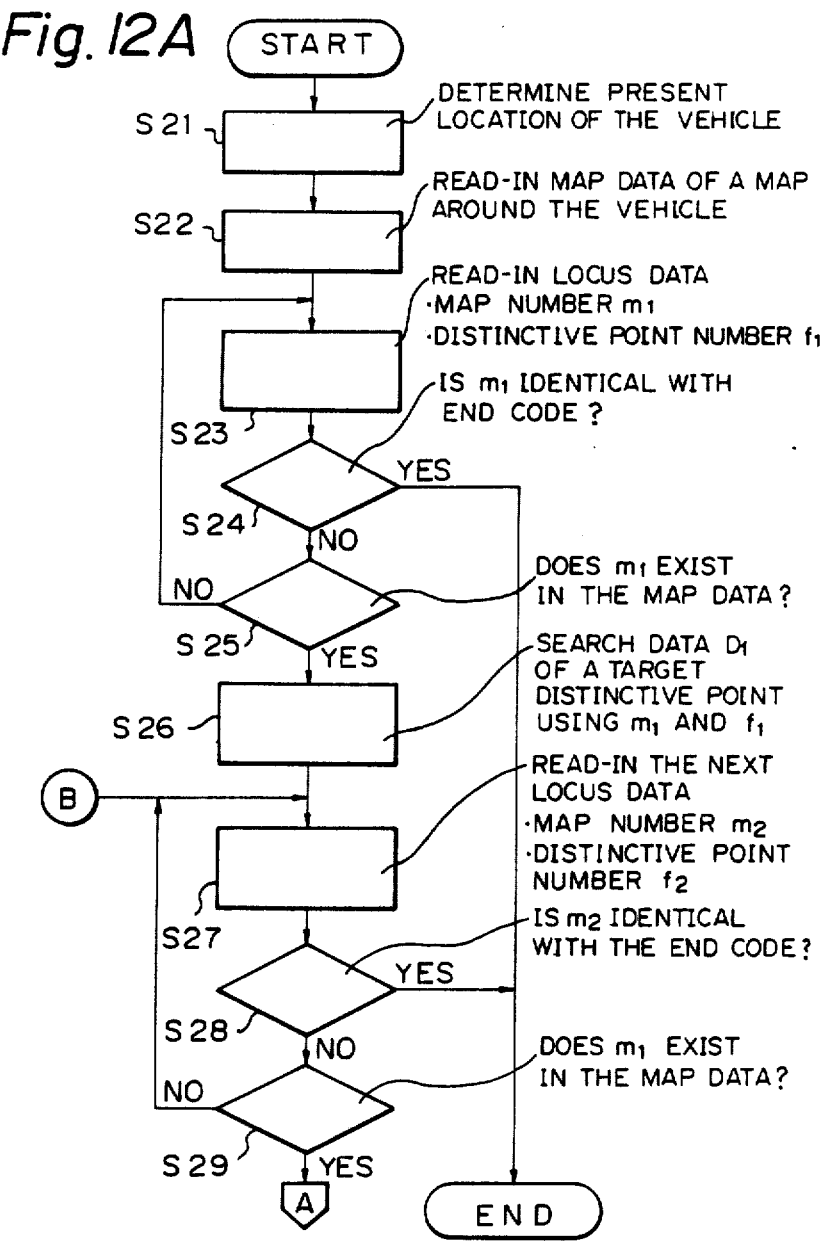
FIG. 12 is a flow chart showing a procedure of displaying the travel locus in the second embodiment of the invention.
Figure 12B:
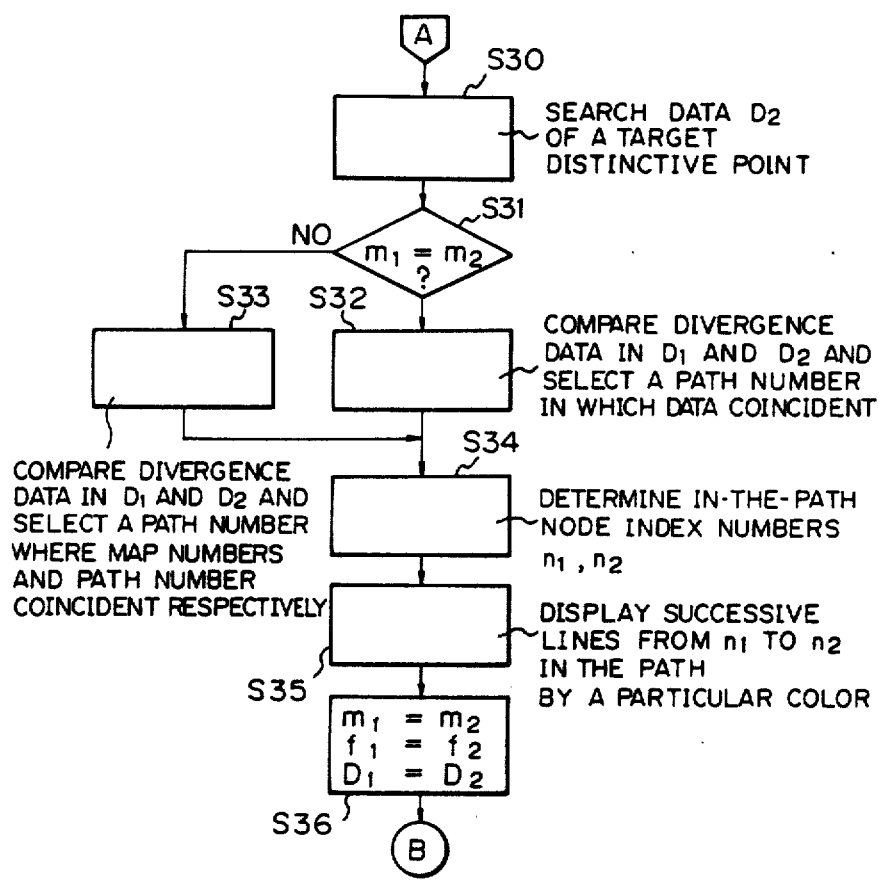

Referring to FIG. 10 through 12, the second embodiment of the present invention will be explained.

FIG. 10 shows the procedure of memorizing the travel locus data in the second embodiment of the invention.

As shown, a step S5-1 is inserted in this embodiment between the steps S5 and S6 as compared with the procedure of the previous embodiment shown in FIG. 5. In the step S5-1, the distinctive point number is also obtained. Furthermore, a step S9' is provided in place of the step S9, in which the distinctive point number f is memorized together with the previous map number m if the answer is negative in the step S6 or the step S7. Then the program proceeds to the step S8. Since the operations in other steps are identical with those of the previous embodiment, the explanation thereof will not be repeated. In addition, the recording format used in the step S9' is as illustrated in FIG. 11.

As explained, the location on which the vehicle itself is running at the moment is managed by using the map number and (X,Y) coordinates in the map, and the path number and the in-the-path node index number are always monitored by a method of the so-called map matching. When the map number or the path number changes, the map number is memorized together with the distinctive point number which is indicated by the pointer from the in-the-path node index number and indicating a distinctive point which the vehicle passed immediately before the occurrence of the above change. The travel locus data is obtained in this way. Therefore, as compared with the case where the map number and the (X,Y) coordinates are memorized every time a predetermined distance is covered as illustrated in FIG. 7, the amount of data to be memorized is much smaller, and moreover the travel locus is memorized very accurately.

Referring to the flowchart of FIG. 12, explanation will be made as to the procedure of displaying the travel locus which is performed by the CPU 6 when a command of displaying the travel locus is inputted through the input device 16.

When the command of displaying the travel locus and route discrimination information are input through the input device, and subsequently the vehicle started to travel toward a destination, the CPU 6 first determines the present location of the vehicle on the basis of each output data of the compass direction sensor 1, the distance sensor 2, and the GPS 3, at a step S21. Subsequently, the map data of a region of the given area including the present location is read-out from the first storage medium 9 and sent to the RAM 8, at a step S22. This maps data is also supplied to the display unit, so that the map data is displayed on the CRT display together with the location of the vehicle itself.

Then, the CPU 6 read-out the travel locus data of the route to be taken designated at the input device 16 from the second storage device 10, at a step S23. The travel locus data is memorized in the format shown in FIG. 6, and the CPU 6 determines whether or not the read-out map number $m_1$ is identical with an end code, at a step S24. If the read map number is not identical with the end code, the CPU 6 then determines whether or not the read-out map number $m_1$ exists in the map data memorized in the RAM 8, at a step S25. If the answer is nagative, the program returns to the step S23. If the answer is affirmative, i.e., if the map number $m_1$ exists in the map data, a target distinctive point data $D_1$ is searched by using the map number $m_1$ and the distinctive point number $f_1$, at a step S26.

Subsequently, the next travel locus data is read-out from the second storage medium 10, at a step S27, and determination is made as to whether or not the second map number $m_2$ is identical with the end code, at a step S28. If the second map number $m_2$ is identical with the end code, this operational flow will be terminated. If the second map number $m_2$ is not identical with the end code, determination is made as to whether or not the read-out map number $m_2$ exists in the map data memorized in the RAM 8, at a step S29. If the map number $m_2$ does not exist in the map data, the program returns to the step S27. If, on the other hand, the map number $m_2$ exists in the map data, another target distinctive point data $D_2$ is searched by using the map number $m_2$ and the distinctive point number $f_2$, at a step S30. Then, whether or not the map number $m_1$ is identical with the map number $m_2$ is determined at a step S31. If the map number $m_1$ is identical with the map number $m_2$, ($m_1 = m_2$), the divergence data is the distinctive point data $D_1$ and the divergence data in the distinctive point data $D_2$ are compared, and a path on which the divergence data are coincident with each other is searched, at a step S31. If, on the other hand, the map number $m_1$ and the map number $m_2$ are not identical with each other ($m_1 \neq m_2$), the divergence data in the distinctive point $D_1$ are the divergence data in the distinctive point $D_2$ are compared with each other, and a path number on which the map numbers and the path numbers are identical with each other respectively is obtained, at a step S33. Then, in-the-path node index numbers $n_1$ and $n_2$ are obtained at a step S34, and a line in the path from the index number $n_1$ to the index number $n_2$ is displayed by using a particular color in the screen, at a step S35. Subsequently, the map number $m_1$, the distinctive point number $f_2$, and the distinctive point data $D_2$, are set as new values of $m_1$, $f_1$, and $D_1$, at a step 36.

By the repetition of the above operations, the travel locus of the route to be traveled, designated through the input device 16 is displayed together with a map showing a region around the present location of the vehicle, using a particular color, on the screen of the CRT display 12.

As will be appreciated from the foregoing description, in the second embodiment of the present invention, at the time of storing data of each location of roads in maps in numerical form, specific distinctive point numbers, which are allotted to particular locations on the road in each map, are stored together with map numbers each of which is allotted to each map and path numbers each of which is allotted to each road within each map; and when the vehicle is running, the map number and the path number are monitored while recognizing the present location of the vehicle, and a previous map number and a previous distinctive point number are memorized if the present map number is different from the previous map number or the present path number is different from the previous path number. Therefore, the travel locus data is accurately memorized by using a smaller amount of data as compared with the case in which positional data is stored every time the traveling distance reaches a given distance.

Referring to FIGS. 13 through 16, the third embodiment of the present invention will be explained hereinafter.

Figure 13:
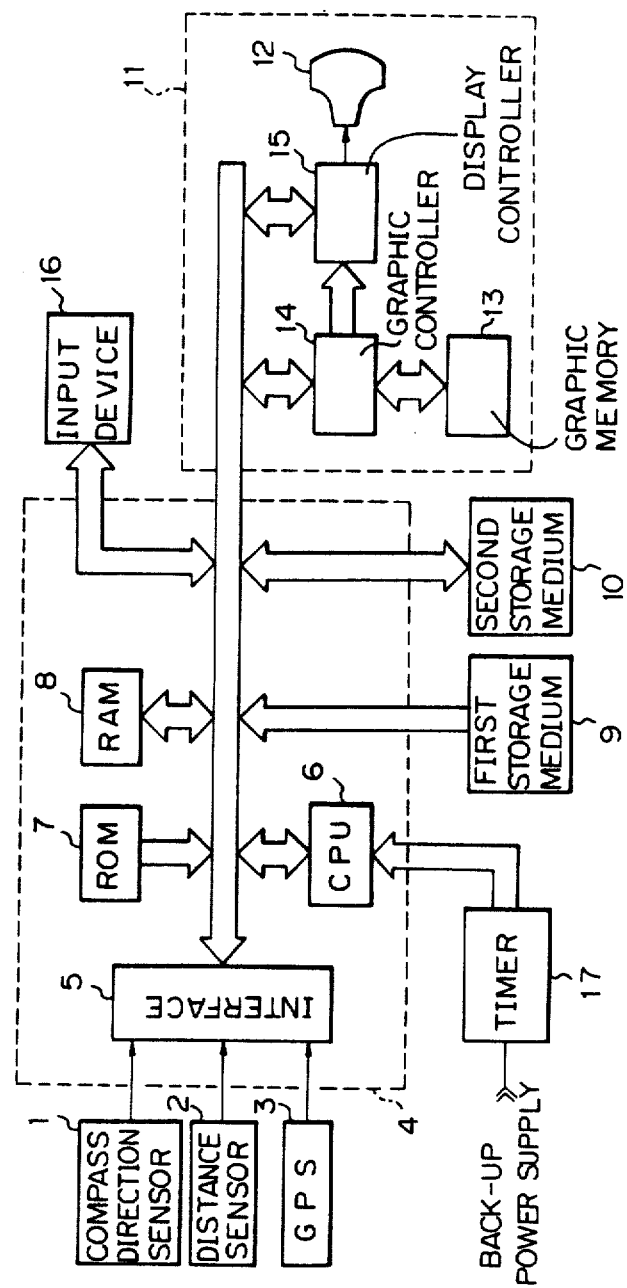
FIG. 13 is a block diagram showing the construction of an on-board navigation system in which a third embodiment of the method of recording travel locus data according to the present invention is adopted.
Figure 14:
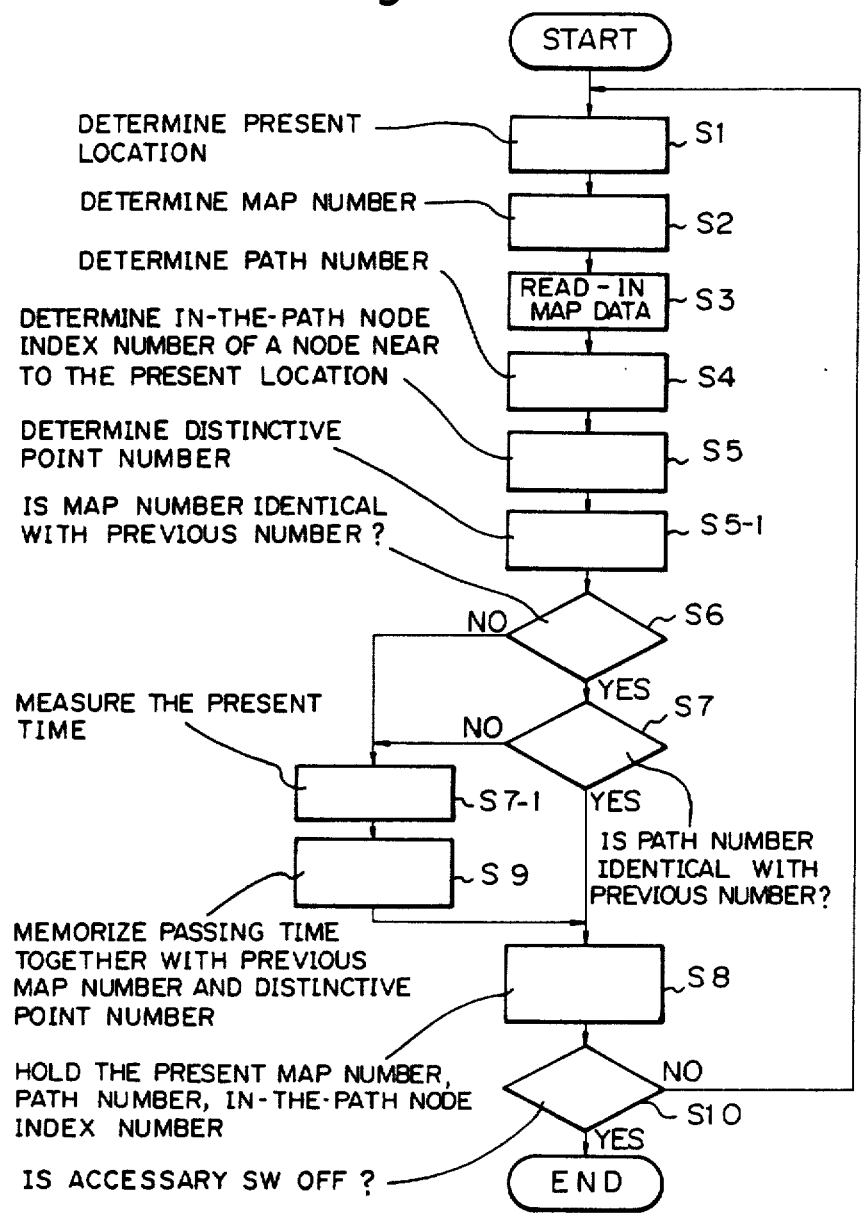
FIG. 14 is a flowchart showing a procedure of memorizing the travel locus data in the third embodiment of the present invention.
Figure 15:
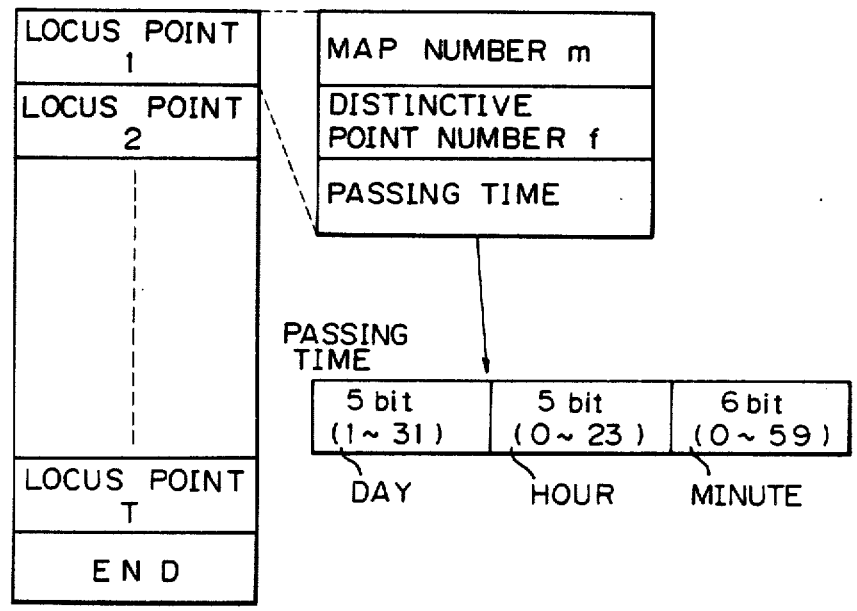
FIG. 15 is a diagram showing a recording format of the travel locus data in the third embodiment of the invention.

FIG. 13 is a block diagram showing the construction of an on-board navigation system in which the third embodiment of the method of memorizing the travel locus data according to the present invention is adopted.

As shown, in addition to the structural element of the system shown in FIG. 1, this system is provided with a timer 17 which operates while receiving a power current from a back-up power supply (not shown). This timer 17 supplies information of the date, hour, and minute to the CPU 6. In the procedure of memorizing the travel locus date in the third embodiment which is shown in FIG. 1, a step S7-1 is provided in addition to the steps shown in FIG. 10. At the step S7-1, a present passing time is detected on the basis of output date of the timer 17 when the answer is negative at the step S6 or step S7. Furthermore, a step S9'' is provided instead of the step S9' of FIG. 10. At the step S9'', the passing time is memorized together with the previous map number m and the previous distinctive point number f in the second storage medium 10 in a format shown in FIG. 15. Then the program proceeds to the step S8.

Thus, the passing time at a point of time when the map number or the path number has changed is also memorized. Therefore, the time required from the starting point to the destination and the time required from each point where the vehicle is passing to the destination are readily obtained.

Figure 16A:
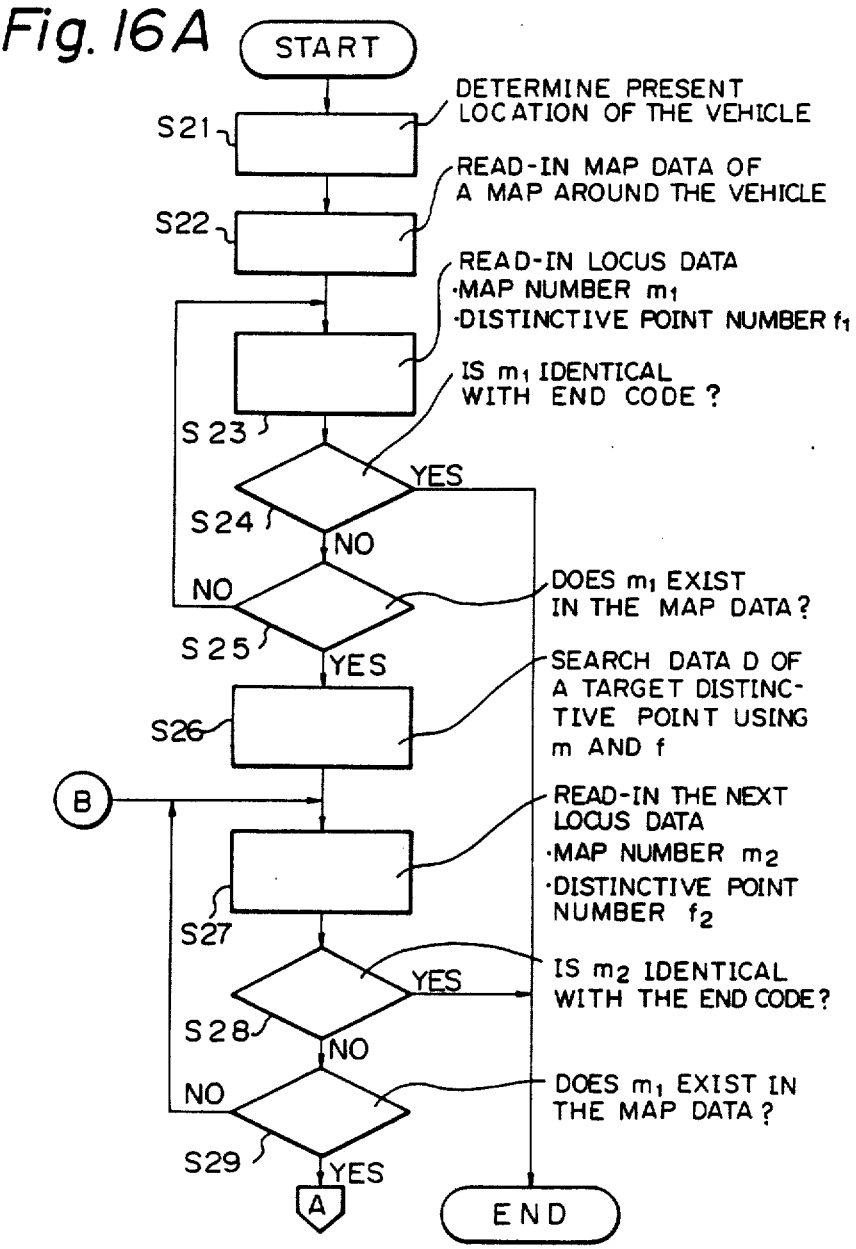
FIG. 16 is a flow chart showing a procedure of displaying the travel locus in the third embodiment of the invention.
Figure 16B:
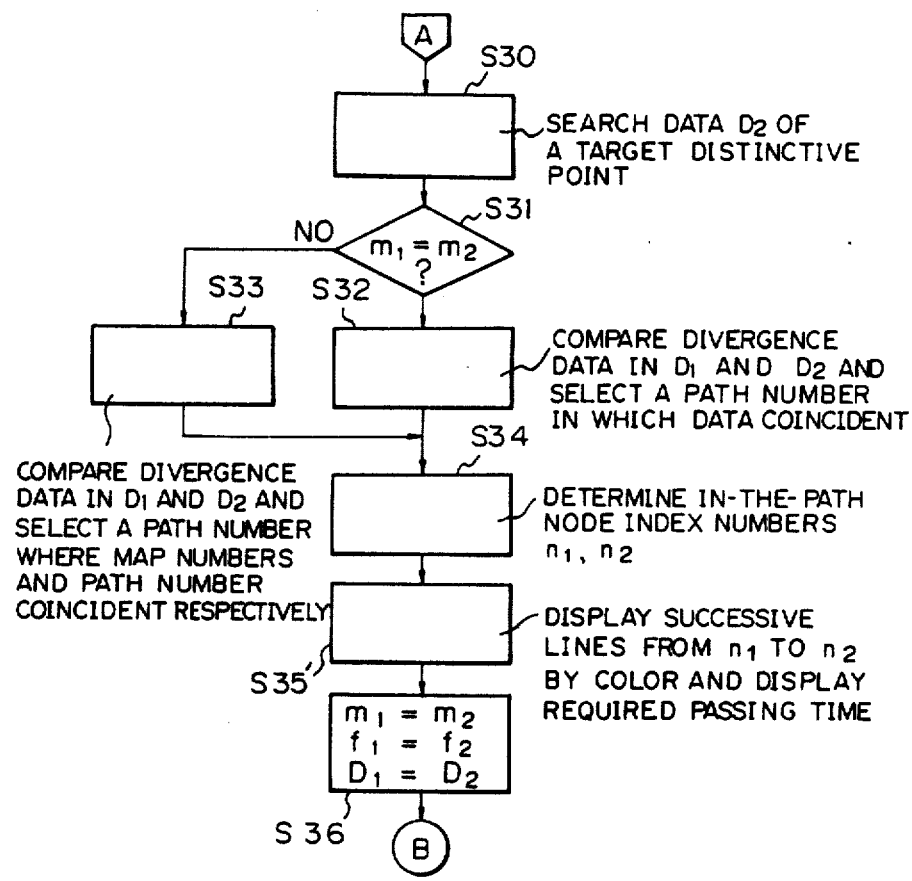

The procedure of displaying the travel locus data in the third embodiment of the present invention will be explained with reference to the flowchart of FIG. 16. The display procedure of the third embodiment shown in this figure is identical with the procedure of the second embodiment shown in FIG. 12 except for the step S35. In this embodiment, a step S35' is provided instead of the step S35. At the step S35', a successive lines from the start node index number $n_1$ to the end node index number $n_2$ in the path obtained at the step S33 is displayed by using a particular color. At this step, a time required to the destination, which is obtained from the passing time memorized with each data, is also displayed. Since the operation of the other steps are identical with those of the corresponding steps shown in FIG. 12, the explanation thereof will not be repeated.

As will be appreciated from the foregoing description, according to the present invention, at the time of storing data of each location of roads in maps in numerical form, specific distinctive point numbers, which are allotted to particular locations on the road in each map, are stored together with map numbers each of which is allotted to each map and path numbers each of which is allotted to each road within each map; and when the vehicle is running, passing times of particular locations are measured and the map number and the path number are monitored while recognizing the present location of the vehicle, and a previous map number and a previous distinctive point number are memorized if the present map number is different from the previous map number or the present path number is different from the previous path number. Therefore, the travel locus data is accurately memorized by using a smaller amount of data as compared with the case in which positional data is stored every time a given distance is covered.

In addition, by the memorization of a passing time when the map number or the path number has changed, the time required from the starting point to the destination, and the time required from each location, where the vehicle is running, to the destination are readily obtained.

What is claimed is:

1. A method of recording the travel locus data for an on-board navigation system of a motor vehicle, the method comprising the steps of:

storing previously determined location data of road maps in numerical form into a first memory including storing a map number for each map, a path number for each road within each map, and an index number for particular locations on each road in each map;

determining the present location data from the present location of the vehicle including a present map number, a present path number and a present index number while the vehicle is moving along a particular path; and comparing the previously determined location data with the present location data and if the present map number is different from the previous map number or if the present path number is different than the previous path number, storing the previously determined location data into a second memory as said travel locus data.

2. A method of recording the travel locus data for an on-board navigation system of a motor vehicle, the method comprising the steps of:

storing previously determined location data of road maps in numerical form into a first memory including storing a map number for each map, a path number for each road within each map, and a specific distinctive point number for particular locations on each road in each map;

determining the present location data from the present location of the vehicle including a present map number, a present path number and a present point number while the vehicle is moving along a particular path; and comparing the previously determined location data with the present location data and if the present map number is different from the previous map number or if the present path number is different than the previous path number, storing the previously determined location data into a second memory as said travel locus data.

3. A method as set forth in claim 2, further comprising measuring passing times of particular locations while the map number and the path number are monitored when the vehicle is running, and storing a passing time together with the previous map number and the previous distinctive point number if the present map number is different from the previous map number or the present path number is different from the previous path number.

* * * * *